(12) United States Patent
Persson

(10) Patent No.: US 6,656,038 B1
(45) Date of Patent: Dec. 2, 2003

(54) COMBINE HARVESTER HAVING A STRAW CHOPPER AND HUSK DISCHARGER

(75) Inventor: Sven Johan Persson, Skara (SE)

(73) Assignee: Rekordverken Sweden AB, Kvänum (SE)

( * ) Notice: Subject to any disclaimer, the term of this patent is extended or adjusted under 35 U.S.C. 154(b) by 0 days.

(21) Appl. No.: 10/018,138

(22) PCT Filed: Jul. 5, 2000

(86) PCT No.: PCT/SE00/01426

§ 371 (c)(1),
(2), (4) Date: Jan. 16, 2002

(87) PCT Pub. No.: WO01/01754

PCT Pub. Date: Jan. 11, 2001

(30) Foreign Application Priority Data

Jul. 6, 1999 (SE) ............................................. 9902587

(51) Int. Cl.⁷ ................................................ A01F 12/40
(52) U.S. Cl. ...................................................... 460/112
(58) Field of Search ................................ 460/111, 112, 460/119, 901, 905; 56/12.8, 13.3

(56) References Cited

U.S. PATENT DOCUMENTS

| 4,056,107 A | * | 11/1977 | Todd et al. | 460/112 |
| 4,614,197 A | * | 9/1986 | Weber et al. | 460/112 |
| 4,617,942 A | * | 10/1986 | Garner | 460/112 |
| 4,637,406 A | * | 1/1987 | Guinn et al. | 460/112 |
| 4,711,253 A | * | 12/1987 | Anderson | 460/100 |
| 5,082,186 A | * | 1/1992 | Bruns | 239/682 |
| 5,120,275 A | * | 6/1992 | Zacharias | 460/111 |
| 5,797,793 A | * | 8/1998 | Matousek et al. | 460/111 |
| 6,358,141 B1 | * | 3/2002 | Stukenholtz et al. | 460/100 |
| 2003/0003974 A1 | * | 1/2003 | Niermann et al. | 460/111 |

FOREIGN PATENT DOCUMENTS

| DE | DT 2444550 A1 | * | 4/1976 |
| DE | 35 29 801 C1 | | 1/1987 |
| DE | 37 04 755 A1 | | 8/1988 |
| DE | 35 46 679 C1 | | 9/1989 |
| DE | 195 05 148 A1 | | 8/1996 |
| DE | 19837002 A1 | * | 2/2000 |
| EP | 0357090 A2 | * | 9/1989 |
| WO | WO 92/05687 | * | 4/1992 |
| WO | WO 02/34029 | * | 5/2002 |

* cited by examiner

*Primary Examiner*—Thomas B. Will
*Assistant Examiner*—Nathan Mammen
(74) *Attorney, Agent, or Firm*—Burns, Doane, Swecker & Mathis, L.L.P.

(57) ABSTRACT

A combine harvester includes a device for discharging husks, the husk discharging device having at least one fan rotatably mounted in a fan casing, the fan casing having at least one husk discharge opening, a device for chopping straw arranged downstream of the husk discharging device, the straw chopping device having a rotating cutting rotor in a rotor casing for chopping straw, the rotor casing having an inlet for unchopped straw and an outlet for chopped straw, and a control device arranged between the husk discharging device and the straw chopping device, the control device being movable between a first position in which the control device closes the inlet of the rotor to bypass the straw chopping device and a second position in which the inlet of the rotor is open to allow chopping of the straw. The husk discharge opening in the fan casing is shiftable between a first position in which husks are permitted to be spread over a substrate, and a second position in which the husks are permitted to mix with unchopped straw.

20 Claims, 5 Drawing Sheets

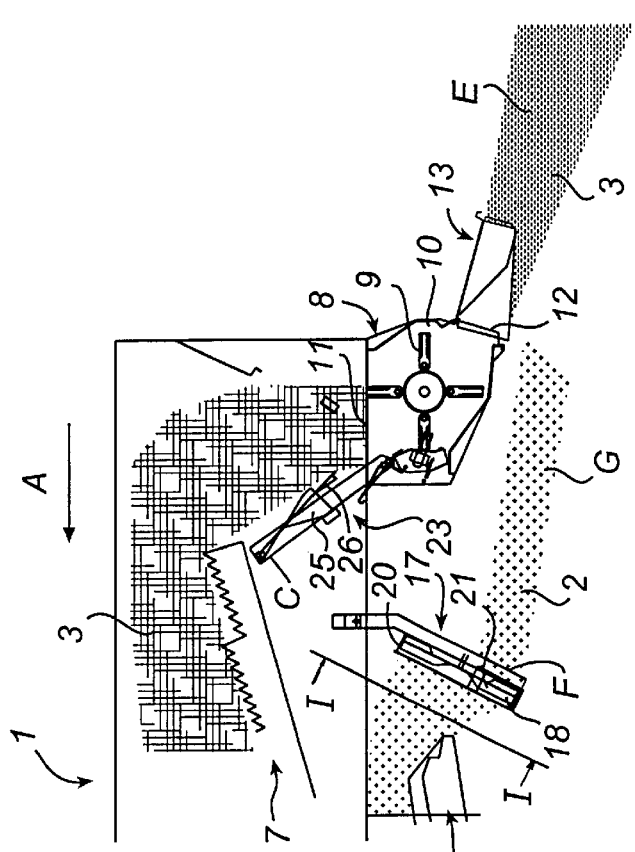
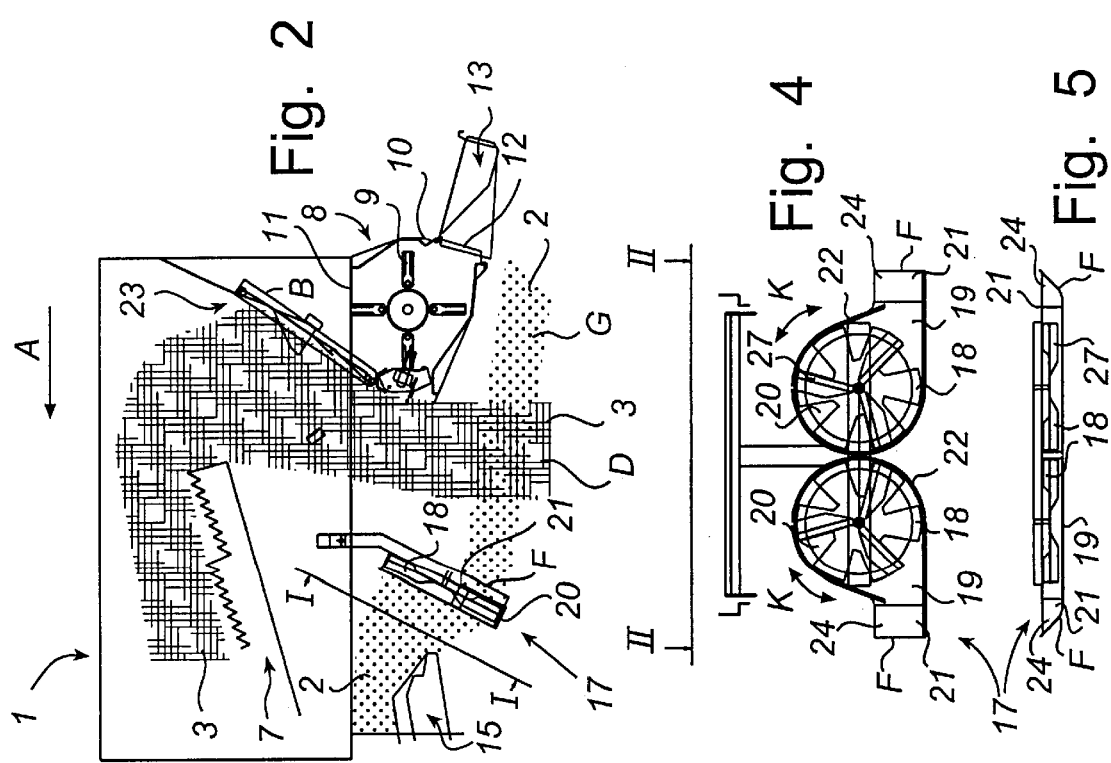

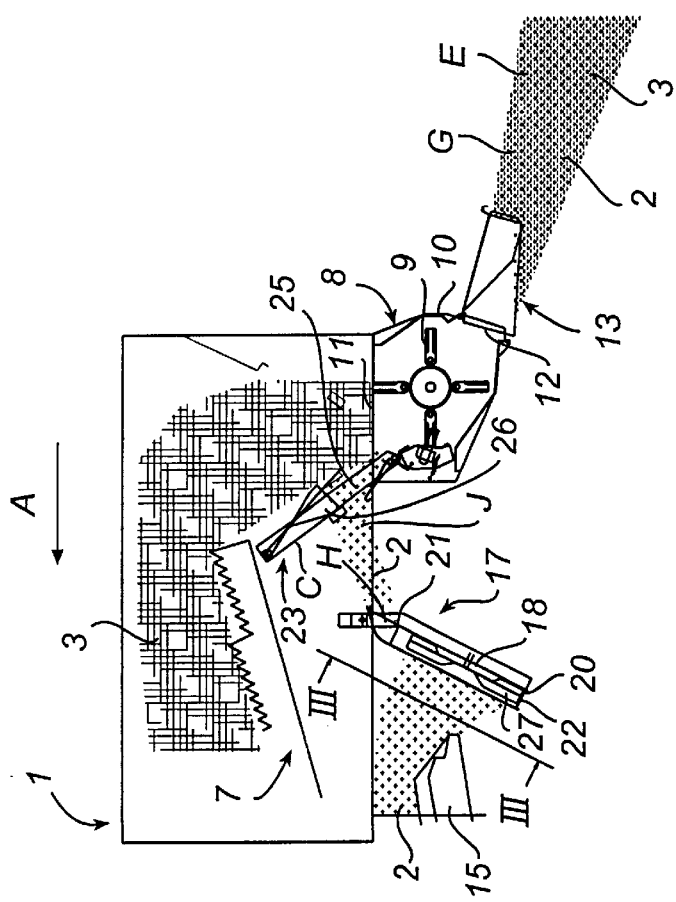
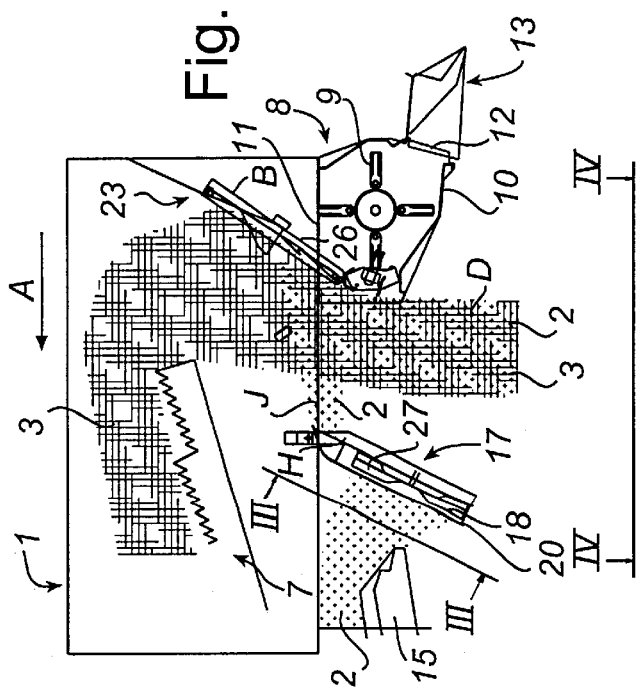
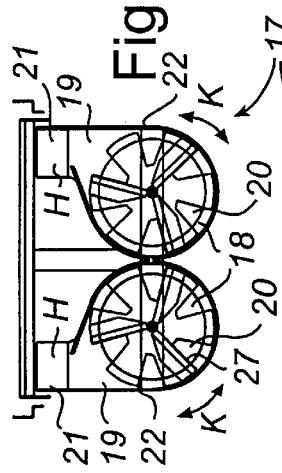
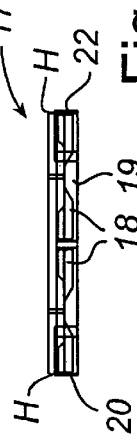

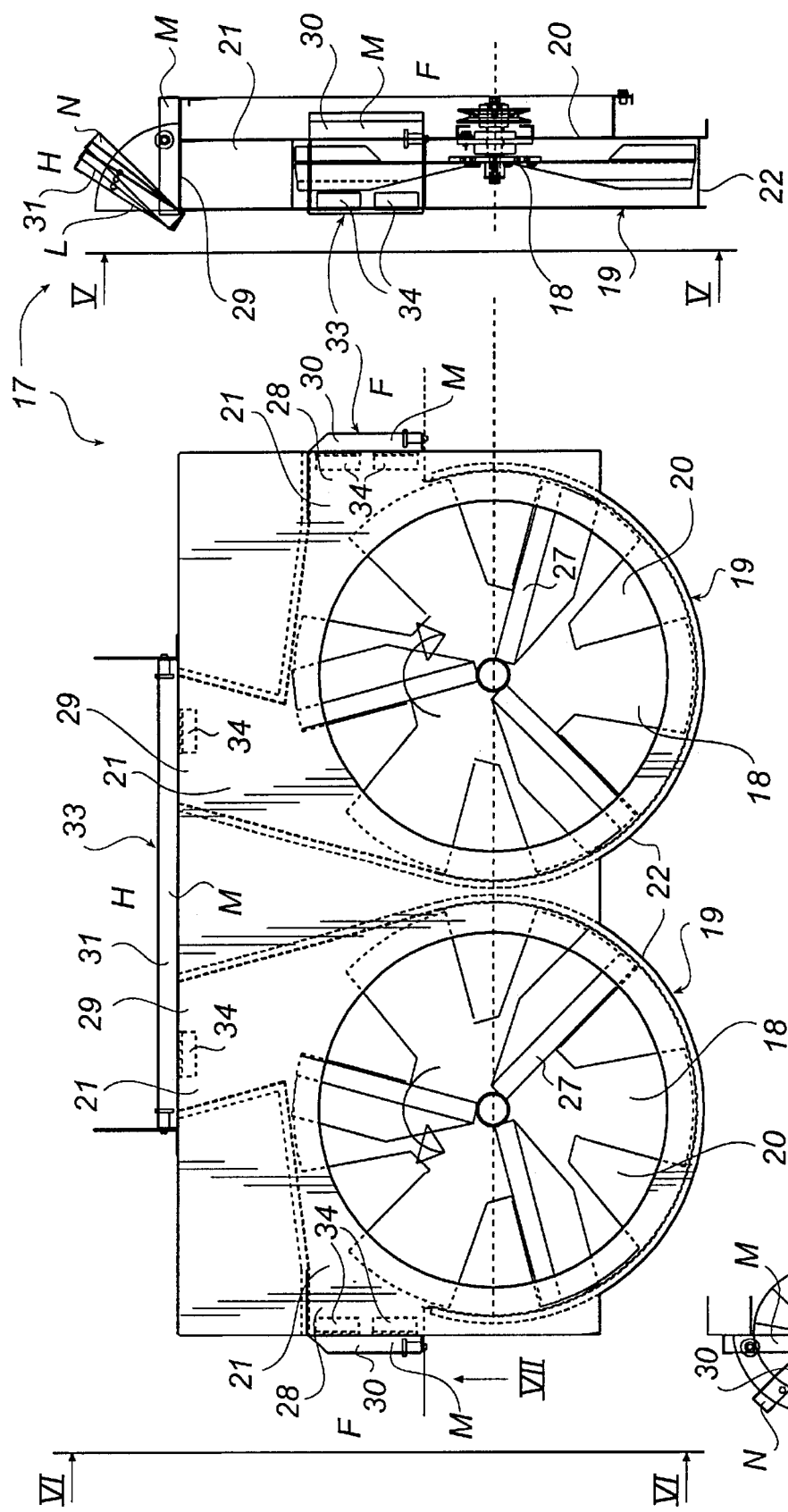

COMBINE HARVESTER HAVING A STRAW CHOPPER AND HUSK DISCHARGER

FIELD OF THE INVENTION

The present invention relates to a combine harvester having on the one hand a device for discharging husks from a sieving unit on the combine harvester, said husk discharging device being arranged downstream of the sieving unit and having at least one fan which is rotatably mounted in a casing with at least one husk discharge opening and, on the other hand, a device for chopping of straw from a straw shaking unit on the combine harvester, said straw chopping device being arranged downstream of the straw shaking unit and the husk discharging device and having a rotating cutting rotor in a casing for chopping the straw, said casing having an inlet for the unchopped straw and an outlet for the chopped straw, a control device being arranged between the husk discharging and straw chopping devices which is movable between a first position, in which it shuts the inlet of the casing of the straw chopping device to bypass the straw chopping device and allow laying of strings of the unchopped straw, and a second position, in which it uncovers the inlet to allow chopping of the straw.

The harvest residues forming in the threshing in the combine harvester normally consist of husks and straw from such crops as wheat, barley, oats and rye, but may also come from, for instance, different kinds of oil plants and maize, sunflowers etc. which have fairly large and stiff plant parts. In the following description however, the terms husks and straw will be used throughout for the sake of simplicity and clarity.

BACKGROUND ART

Modern combine harvesters become larger and larger with broader and broader cutting tables which in themselves are significantly broader than the width of the actual harvester. In threshing, large amounts of smoke and dust arise in the vicinity of the harvester, which is a great problem in respect of the engine and above all the great risk of fire. To reduce this risk, it is important that as large amounts as possible of the residues of harvest consisting of straw and husks be spread as far outwards backwards from the harvester as possible.

The husk discharging device connected to the sieving unit of the harvester is roughly as wide as the actual harvester and should normally after threshing spread the husks sideways and rearwards over an area which essentially corresponds to the width of the cutting table. The straw chopping device arranged downstream of the husk discharging device and connected to the straw shaking unit of the harvester is also approximately of the same width as the actual harvester and should normally after threshing cut the straw into small pieces and spread the cut straw over an area after the harvester which essentially corresponds to the width of spreading the husks. After the spreading of the husks and the cut straw as described above, the husks together with the straw are as a rule ploughed back into the ground.

If, for various reasons, it is desirable not to cut the straw in the straw chopping device but instead to lay strings of straw after the combine harvester for subsequent collection and suitably baling to be used, for instance, as feed, bedding etc. this can easily be done by moving the movable control device to its first position, and vice versa to its second position for cutting of the straw.

Moreover, it is previously known per se in a similar combine harvester to blow the husks from the sieving unit directly into the straw chopping device through its inlet to be mixed with the straw that is to be chopped. If the straw would then instead be laid in strings there is no possibility of spreading the husks sideways and rearwards.

OBJECTS OF THE INVENTION

The main object of the invention is that the operator of the combine harvester, in consideration of, inter alia, the risk of fire, the type of crop to be harvested, the moisture content of the crop and how the crop residues are to be treated etc, should himself be able to choose/determine whether the husks and the straw are to be spread separately or jointly, no matter whether the straw is to be chopped or laid in strings.

A further object of the invention is to enable this freedom of choice with technically and functionally simple and quick means.

SUMMARY OF THE INVENTION

According to the invention, these and other objects are achieved in a manner which is as simple as ingenious by the husk discharge opening in the fan casing of the husk discharging device being alternatingly settable between a first position where the husks are made to spread over the substrate, and a second position where the husks are mixable into the unchopped straw.

If the straw is to be laid in strings, the mixing of the husks into the straw which is to be laid in strings can preferably be carried out with the control device in its first position and the husk discharge opening in its second position. However, if the straw is to be chopped, the mixing of the husks into the straw that is to be chopped may be carried out with the control device and the husk discharge opening in their second positions, whereupon the husks are chopped and spread together with the chopped straw.

BRIEF DESCRIPTION OF THE DRAWINGS

The invention will now be described in more detail with reference to the accompanying drawings, in which FIG. 2 is a schematic side view of the rear part of the combine harvester according to FIG. 1 in order to illustrate a function involving laying strings of straw and spreading of husks, FIG. 3 is a view corresponding to FIG. 2 to illustrate a function involving chopping and spreading of straw and spreading of husks, FIG. 4 is a view along line I—I in FIGS. 2 and 3, FIG. 5 is a view along line II—II in FIG. 4, FIG. 6 is a view corresponding to FIG. 2 in order to illustrate a function involving laying of strings of straw and mixing of husks into the straw, FIG. 7 is a view corresponding to FIG. 2 in order to illustrate a function involving mixing and chopping of straw and husks and joint spreading thereof, FIG. 8 is a view along line III—III in FIGS. 6 and 7.

FIG. 9 is a view along line IV—IV in FIG. 8,

FIG. 10 is a view essentially corresponding to FIGS. 4 and 8 and along line V—V in FIG. 11 of a husk discharging device according to a second preferred embodiment and fitting the combine harvester in FIG. 1, FIG. 11 is a view along line VI—VI in FIG. 10, FIG. 12 is a view in the direction of arrow VII in FIG. 10.

DETAILED DESCRIPTION OF PREFERRED EMBODIMENTS

Figure 1:
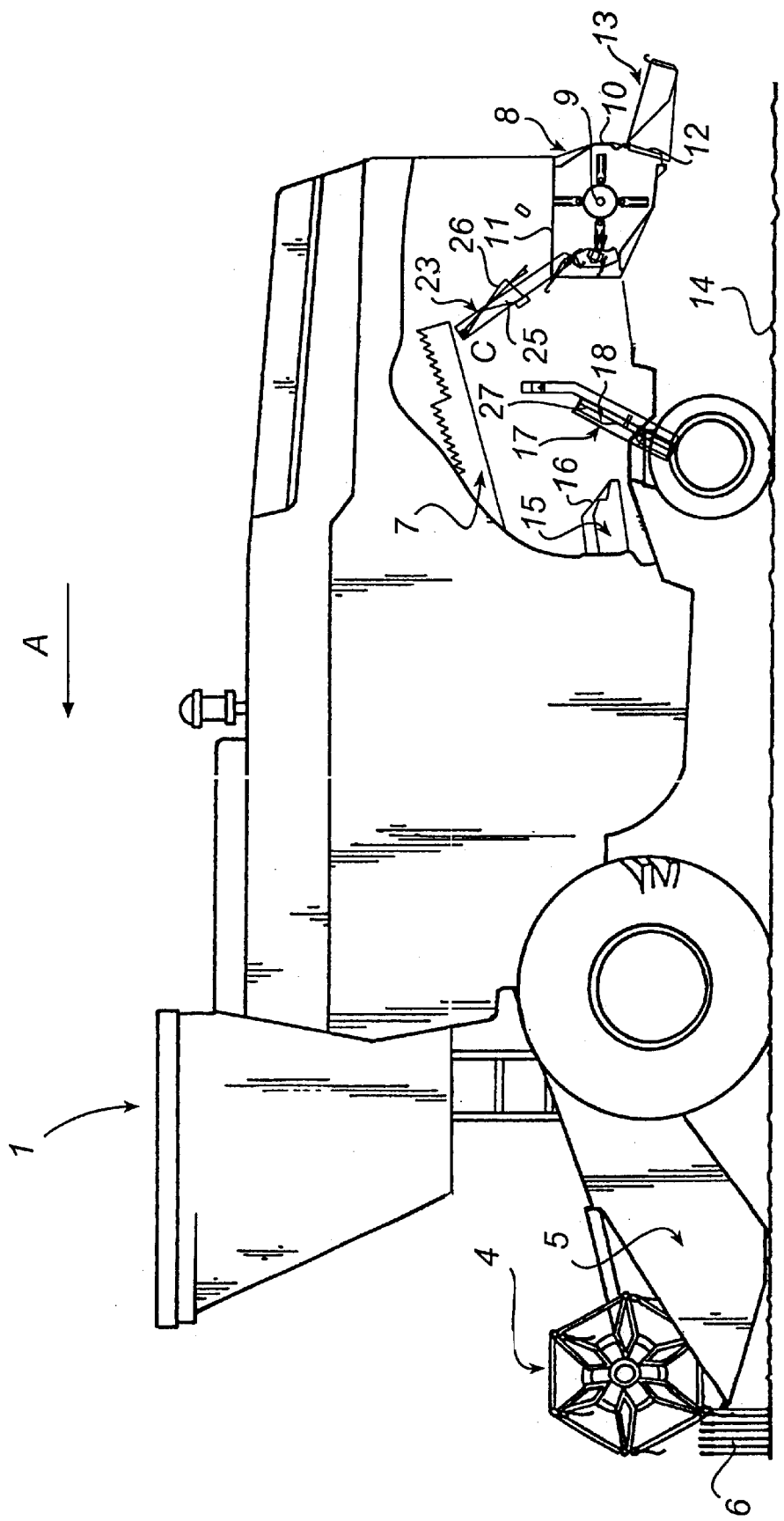
FIG. 1 is a schematic side view of a combine harvester with, inter alia, a husk discharging device according to a first embodiment of the invention.

The combine harvester generally designated 1 in the drawings is, except for devices for handling husks 2 and straw 3, which will be described in more detail below, of an essentially conventional configuration with a pick-up coiler 4 and a cutting table 5 which is significantly broader than the width of the combine harvester 1. The crop, in this case straw feed plants 6 or the like, which is to be harvested, is cut off on the cutting table 5 and transported by means conveyors or the like (not shown), to a threshing machine (not shown), where the straw 3 and grains (not shown) are separated from each other.

The straw 3 continues through a straw shaking unit generally designated 7 to a straw chopping device generally designated 8 and arranged at the rear part of the combine harvester 1 in the direction of travel A thereof. The straw chopping device 8 thus is arranged downstream of the straw shaking unit 7 and is largely configured as a conventional flail chopper with a rotating cutting rotor 9 in a casing 10 for chopping the straw 3. The casing 10 has an inlet 11 facing the straw shaking unit 7 and intended for the threshed but unchopped straw 3 and an outlet 12 for the chopped straw 3. After the straw chopping device 8 a spreader, generally designated 13, is suitably arranged for spreading the chopped straw 3 coming from the straw chopping device 8 through the outlet 12 of the casing 10 and, where appropriate, as will be described below, husks 2 over a substrate 14, here in the form of a field.

The grains coming from the threshing machine (not shown) and the husks 2 (and chaff) reach a sieving unit generally designated 15 (not shown), in which the husks 2 are separated from the heavier grains and fed in the direction of the outlet end 16 of the sieving unit 15. In the area of the outlet end 16 there is a device generally designated 17 and intended for discharge of the husks 2 from the sieving unit 15. The husk discharging device 17 is more specifically suitably pivotally suspended from the combine harvester 1 downstream of the sieving unit 15 and fixable in the position shown in the drawings and in at least one further position (not shown) in which it is turned downwards or rearwards for, for instance, maintenance and adjustment of the sieving unit 15.

The husk discharging device 17 has, in the embodiments described and shown, two plate-like fans 18. The fans are rotatable in opposite directions and are rotatably mounted in a common casing 19 or in a casing each, each casing having an end wall 20 facing away from the sieving unit 15 and a curved circumferential wall 22 provided with a husk discharge opening 21. The number of fans 18 may vary as desired. In the embodiments here illustrated there are two fans, but the husk discharging device 17 can have only one fan 18 or more than two fans.

The actual fan/fans 18 do not constitute part of the present invention and will therefore not be described in more detail here. It is sufficient to mention that each fan 18 has a number of radially directed blades 27 to eject the husks 2 coming the sieving unit 15 through the associated husk discharge opening 21 in the fan casing 19 of the husk discharging device 17.

Between the husk discharging device 17 and the straw chopping device 8 there is a control device generally designated 23. The control device 23 is in the embodiment illustrated suitably formed of a deflector plate which at its lower end is pivotally mounted on the combine harvester 1. More specifically, the deflector plate 23 is pivotally movable between a first position B shown in FIGS. 2 and 6 and a second position C shown in FIGS. 1, 3 and 7. In the first position B, the deflector plate 23 closes the inlet 11 of the casing 10 of the straw chopping device 8 in order shunt or bypass the straw chopping device 8 and allow laying of strings D of the unchopped straw 3. In the second position C, however, the deflector plate 23 uncovers the same inlet 11 to allow chopping of the straw in the straw chopping device 8 and spreading E of the chopped straw 3.

Further to the husk discharge opening 21 in the fan casing 19 of the husk discharging device 17, it is alternatingly settable between a first position F for spreading G of the husks 2 over the substrate 14 by means of the fan 18, as shown in FIGS. 2 and 3, and a second position H for mixing J of the husks 2 into the unchopped straw 3, as shown in FIGS. 6 and 7. When, as in the shown embodiments, the husk discharging device 17 has two fans 18 each having a husk discharge opening 21, these husk discharge openings 21 can either be individually or jointly shiftable between their two positions F and H. This option/possibility of setting, of course, also exists even if there are more than two fans 18 in the husk discharging device 17.

If the husks 2 (see FIG. 6) are to be mixed into the straw 3 which is to be laid in strings D, this mixing J is carried out with the control device forming the deflector plate 23 in its first position B closing the inlet 11 of the casing 10 of the straw chopping device 8 and with each husk discharge opening 21 shifted to its second position H described above.

However, if the mixing J of the husks 2 is to be made into the straw 3 which is to be chopped in the straw chopping device 8 (see FIG. 7), then the admixing is carried out with both the deflector plate 23 and each husk discharge opening 21 in their second positions C and H, whereupon the husks 2 are chopped and spread G together with the chopped straw 3.

For quick and safe mixing J of the husks 2 into the straw 3 which is to be chopped in the straw chopping device 8 with the deflector plate 23 thus in its second position C, the deflector plate is formed with a passage 25 for these husks. Preferably the passage 25 is openable and closable by means of a cover unit 26 (not shown) which is integrated in the deflector plate 23. The cover unit 26 is open in order to open the passage 25 when the deflector plate 23 is in its second position C, shown in FIGS. 1, 3 and 7, where the deflector plate uncovers the inlet 11 of the casing 10 of the straw chopping device 8 in order to allow mixing J of the husks 2 into the straw 3 which is to be chopped and chopping of the husks and straw as well as the joint spreading G and E of the husks and the straw after the combine harvester 1. Vice versa, the cover unit 26 is closed in order to close the passage 25 when the deflector plate 23 is in its first position B shown in FIGS. 2 and 6, where the deflector plate closes the inlet 11 in order to allow the laying of strings D of the straw 3.

In a variant where there are two or more husk discharge openings 21, it is of course possible to shift at least one opening to the first position F for spreading G part of the husks 2 over the substrate 14 and at least one other opening to the second position H for mixing the rest of the husks 2 into the straw 3 which is to be laid in strings D without chopping or which is to be chopped and spread E. It goes without saying that further combinations are feasible.

In the embodiment described and shown in FIGS. 2–9, the husk discharge opening 21 or each such opening is alternatingly settable between its first and second positions F and H by turning K of the fan casing 19 or the associated fan casing 19 about the centre axis of the associated fan 18. This turning K can take place in many convenient ways, preferably manually by means of a handle (not shown). Alternatively, the turning can be carried by means of an actuator (not shown) which can be operated electrically, hydraulically, pneumatically or in some other manner.

The degree of turning K of the fan casing/casings 19 is to some extent dependent on the relative positioning of the husk discharging device 17 and the straw chopping device 8, but in the embodiment shown in FIGS. 2–9, the fan casing/casings 19 are turned essentially through 90° between the first and second positions F and H.

In an embodiment of the invention not shown in the drawings, the husk discharge opening 21 in its second position H is directed towards an inlet of an extra fan. This extra fan serves to draw in the husks 2 from the husk discharging device 17 and has an outlet connected to the straw chopping device 8 to inject these husks into the straw 3 that is to be chopped. The extra fan can then conveniently be driven by the actual straw chopping device 8, preferably be mounted on and driven by the ordinary drive shaft of the cutting rotor 9 of the straw chopping device. A further alternative is to drive the extra fan by means of a separate drive which can be electric, hydraulic etc.

If there are, as mentioned above, two or more husk discharge openings 21, these openings can, in the embodiment involving an extra fan, be directed towards one or more inlets of one and the same fan or be individually directed towards an inlet of a respective fan. In that case, there may be no need for turning each fan casing 19 through essentially 90°, as mentioned above, but maybe through only about 30–60° between the first and the second positions F and H for each husk discharge opening 21. Further variants are, for course, conceivable also in this case.

The husk discharge opening 21 in the fan casing 19 of the husk discharging device 17 has preferably a specially designed outlet 24, as is best seen in FIG. 5. With the husk discharge opening 21 in its first position F shown in FIGS. 1–5, this outlet 24 is directed essentially at an angle of 45° obliquely backwards in the direction of travel A of the combine harvester 1 in order to achieve still better spreading G of the husks 2 in the same direction as far outwards backwards from the combine harvester 1 as possible.

FIGS. 10–12 and FIGS. 13 and 14 illustrate a second and a third preferred embodiment of the husk discharging device 17. The second and third embodiments differ from the first embodiment shown in FIGS. 2–9 essentially by the husk discharge opening 21 being shiftable between its first and second positions F and H by, instead of turning the fan casing 19, having on the one hand a first outlet 28 in the area of the first position F and, on the other hand, a second outlet 29 in the area of the second position H. The outlets 28 and 29 are optionally, either alternatingly or wholly or partly simultaneously, openable and closable for spreading the husks 2 over the substrate 14 and/or mixing the husks into the unchopped straw 3.

This opening and closing of the outlets 28, 29 is suitably carried out by means of a closing element which is generally designated 33 and which is operable manually, electrically, hydraulically or in any other manner (not shown) between the positions L and M opening and closing the outlets 28 and 29.

In the second embodiment according to FIGS. 10–12, the closing element 23 is preferably in the form of covers 30 and 31 associated with a respective one of the outlets 28 and 29. The covers 30, 31 are, by means of hinges 34 or in some other suitable manner, articulated to the husk discharging device 17, preferably its fan casing 19, in the area of the opening of the associated outlet 28, 29. Moreover the covers 30 and 31 are between their positions L and M opening and closing the covers 28 and 29, see FIGS. 11 and 12, settable in different angles/positions N therebetween for adjusting the spreading and mixing direction of the husks 2 from the outlets 28 and 29.

As is evident from FIG. 10, which like FIGS. 2–9 shows an embodiment of the husk discharging device 17 with two oppositely rotating fans 18 mounted in a common casing 19, there are two side covers 30, one to the left and one to the right, which are associated with the left and right outlets 28 of each husk discharge opening 21, and a top cover 31 which is common to the two upper outlets 29 of the respective husk discharge openings. It goes without saying that the common top cover 31 could be replaced by two separate and individually/jointly operable top covers 31.

Figures 13, 14:
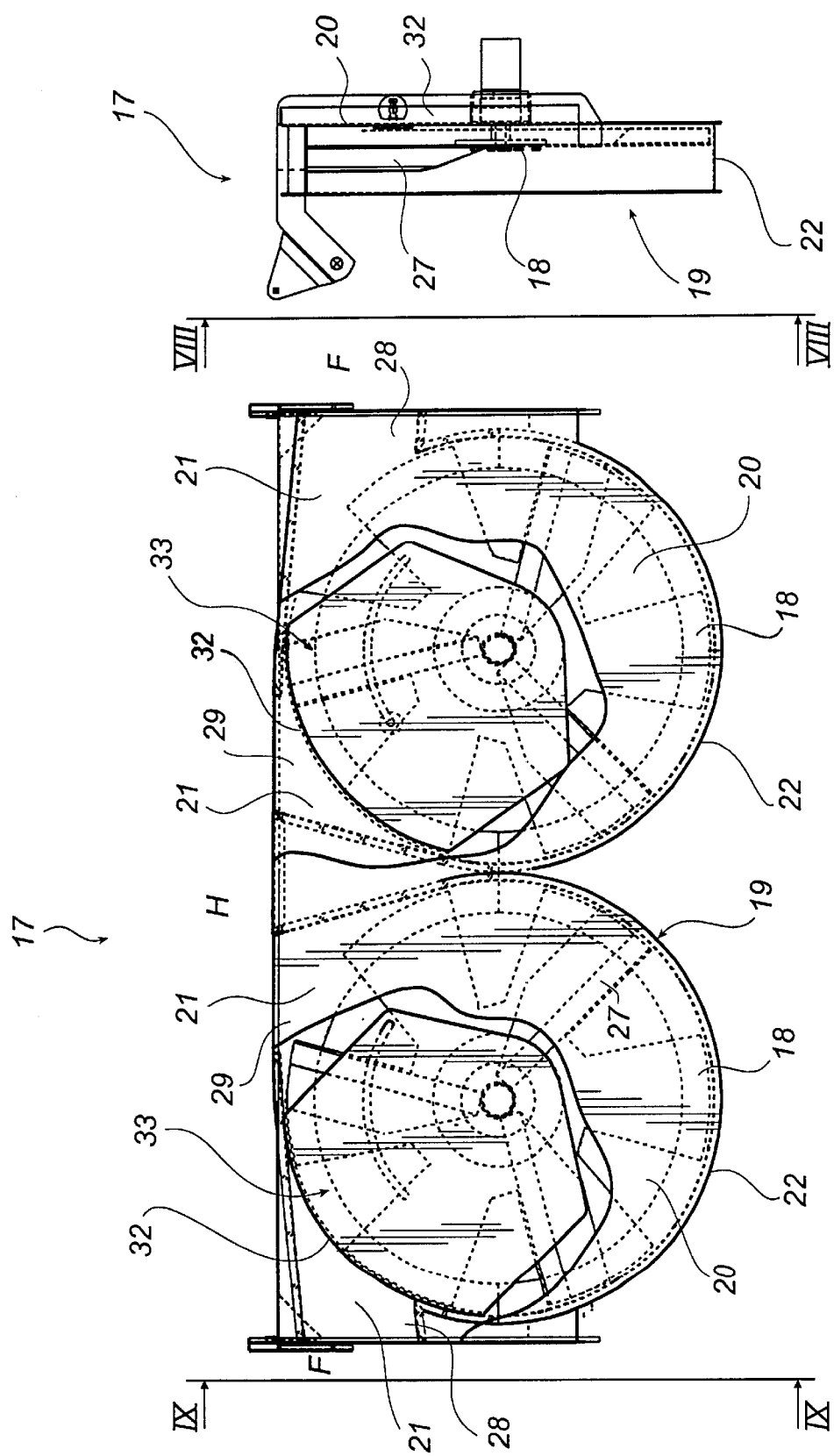
FIG. 13 is a view corresponding to FIG. 10 and along line VIII—VIII in FIG. 14 of a husk discharging device according to a third preferred embodiment and fitting the combine harvester in FIG. 1.
FIG. 14 is a view along line IX—IX in FIG. 13.

In the third embodiment, shown in FIGS. 13 and 14, of the husk discharging device 17, the closing element 33 is instead configured as a slide valve 32. The slide valve is preferably turnably mounted in the fan casing 19 of the husk discharging device 17 essentially concentrically with the axis of rotation of the fan 18 and is alternatingly movable/turnable through about 90° between its positions L and M opening and closing its outlets 28 and 29.

FIG. 13 illustrates once more the embodiment involving two oppositely rotating fans 18 which are each rotatable about an axis of rotation in a common casing 19. For the sake of clarity, the right part of FIG. 13 shows spreading of the husks 2 to the right (position F) through the right outlet 28 by the slide valve 32 opening this outlet 28 and closing the upper right outlet 29 upwardly towards the control device 23 while the left half of FIG. 13 illustrates mixing of the husks 2 into the unchopped straw (position H) through the upper left outlet 29 by the slide valve 32 opening this upper outlet 29 and closing the left outlet 28. Of course, the invention must not be considered restricted to the embodiments described above and shown in the drawings, and their variants, and can be modified in various ways within the scope of the invention as defined in the appended claims.

What is claimed is:

1. A combine harvester comprising:
   a device for discharging husks, the husk discharging device having at least one fan rotatably mounted in a fan casing, the fan casing having at least one husk discharge opening;
   a device for chopping straw arranged downstream of the husk discharging device, the straw chopping device having a rotating cutting rotor in a rotor casing for chopping straw, the rotor casing having an inlet for unchopped straw and an outlet for chopped straw; and
   a control device arranged between the husk discharging device and the straw chopping device, the control device being movable between a first position, in which the control device closes the inlet of the rotor casing to bypass the straw chopping device and a second position in which the inlet of the rotor is open to allow chopping of the straw,
   wherein the husk discharge opening in the fan casing is shiftable between a first position in which husks are permitted to be spread over a substrate, and a second position in which the husks are permitted to mix with unchopped straw.

2. A combine harvester according to claim 1, wherein the husk discharge opening is shiftable between its first and second positions by turning of the fan casing.

3. A combine harvester according to claim 2, wherein the fan casing is turnable through an angle between 30°–90°.

4. A combine harvester according to claim 1, wherein the husk discharge opening is shiftable between its first and second positions by opening and closing a first outlet in the first position and closing and opening a second outlet in the second position, respectively.

5. A combine harvester according to claim 4, wherein a closing element is provided for opening and closing of the first and second outlets.

6. A combine harvester according to claim 5, wherein the closing element is manually, electrically or hydraulically operable.

7. A combine harvester according to claim 6, wherein the closing element includes covers associated with respective ones of the first and second outlets, the covers being articulated to the husk discharging device and being adjustable between at different angles between opened and closed positions for adjusting spreading and mixing directions of the husks from the outlets.

8. A combine harvester according to claim 6, wherein the closing element includes a slide valve arranged relative to the fan casing and movable between different positions for opening and closing the first and second outlets.

9. A combine harvester according to claim 5, wherein the closing element includes a slide valve arranged relative to the fan casing and movable between different positions for opening and closing the first and second outlets.

10. A combine harvester according to claim 9, wherein the slide valve is turnably mounted relative to the casing essentially concentrically with an axis of rotation of the fan.

11. A combine harvester according to claim 5, wherein the closing element includes covers associated with respective ones of the first and second outlets, the covers being articulated to the husk discharging device and being adjustable between at different angles between opened and closed positions for adjusting spreading and mixing directions of the husks from the outlets.

12. A combine harvester according to claim 11, wherein the closing element includes a slide valve arranged relative to the fan casing and movable between different positions for opening and closing the first and second outlets.

13. A combine harvester according to claim 1, wherein husks are mixed with unchopped straw and a mixture of husks and unchopped straw exits the device when the control device is in its first position and the husk discharge opening is in its second position.

14. A combine harvester according to claim 1, wherein husks are mixed with unchopped straw and a mixture of husks and unchopped straw is chopped when the control device and the husk discharge opening are in their second positions.

15. A combine harvester according to claim 14, wherein the harvester includes an extra fan for drawing in the husks from the husk discharging device when the husk discharge opening is in its second position, and wherein the extra fan has an outlet connected to the straw chopping device and arranged to inject the husks into the unchopped straw.

16. A combine harvester according to claim 15, wherein the extra fan is driven by the straw chopping device.

17. A combine harvester according to claim 1, wherein the husk discharge opening has an outlet which, with the husk discharge opening shifted to its first position, is directed at an angle of approximately 45° obliquely backwards seen in a direction of travel of the harvester for spreading the husks in the direction of travel of the harvester.

18. A combine harvester according to claim 1, wherein the control device includes a deflector plate that is pivotable between first and second positions and has a passage for husks.

19. A combine harvester according to claim 18, wherein the passage is openable and closable, and the passage is open when the deflector plate is in a second position for chopping straw and the passage is closed when the deflector plate is in a first position to bypass the straw chopping device.

20. A combine harvester according to claim 1, wherein the husk discharge opening in the fan casing is shiftable relative to the fan between the first position and the second position.

* * * * *